May 26, 1925.
C. V. McCARLEY
LIGHT DEFLECTOR
Filed Feb. 4, 1924
1,539,131
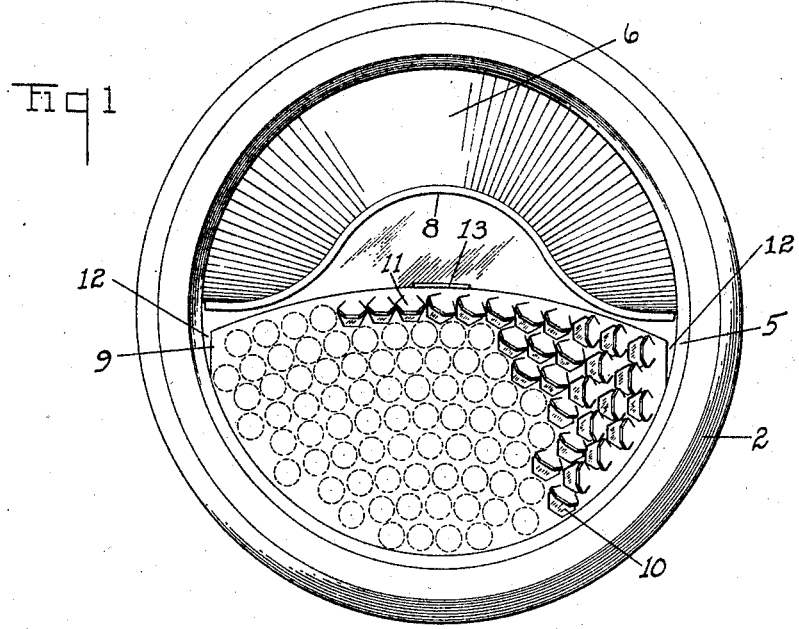
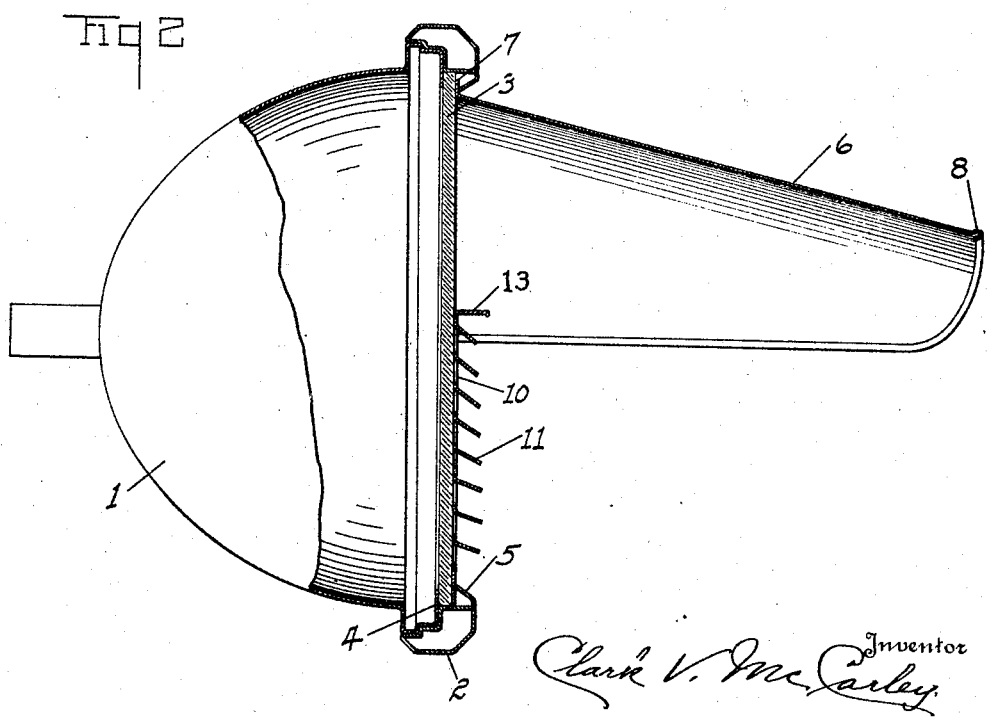

Patented May 26, 1925.

1,539,131

UNITED STATES PATENT OFFICE.

CLARK V. McCARLEY, OF McCLURE, OHIO.

LIGHT DEFLECTOR.

Application filed February 4, 1924. Serial No. 690,371.

*To all whom it may concern:*

Be it known that I, CLARK V. McCARLEY, a citizen of the United States, and a resident of McClure, in the county of Henry and State of Ohio, have invented a new and useful Light Deflector, which invention is fully set forth in the following specification.

My invention has for its object to provide an efficient light deflector for confining the rays of light from the headlight of an automobile to the road, and preventing the rays of light from entering the eye of the driver of an approaching automobile. A great variety of light deflectors have heretofore been used but on account of diffusion of light from the reflector of the lamp, it has been practically impossible by the use of the deflectors heretofore known, to confine the rays of light to the road and prevent them from blinding the driver of an approaching automobile.

By my invention is provided a reticulated member having a plurality of deflectors covering the openings of the member to confine the rays of light that pass through the openings to a particular direction, and thus preventing the diffused rays from rising to a height above the roadway, which would otherwise cause the blinding of the driver of an approaching vehicle. The member may be used in conjunction with a visor. It may be constructed so as to cover the entire lens of the lamp, or to cover only the lower half or a part of the lens of the lamp. Preferably, it is constructed to cover the lower half, the rays of light passing through the upper half being diverted by means of a visor.

The invention may be contained in structures which in their details vary. To illustrate a practical application of the invention, I have selected a structure containing the invention and shall describe it hereinafter. The device embodying the invention is illustrated in the accompanying drawings.

Figure 1 is a front view of an automobile lamp, having a visor and a perforated member having parts to deflect the light that passes through the openings of the member.

Figure 2 is a side view of the device partly in section.

The lamp 1 is provided with the usual lens confining ring 2 that is usually secured to the lamp by a bayonet slot connection in the manner well known in the art. It is commonly constructed to secure the lens or glass 3 between a flange or inwardly extending ledge 4 formed on the body of the lamp, and a ledge or flange 5 formed on the rim. These two parts press against opposite sides of the glass 3 to support the glass 3 in position.

The rays of light that are reflected from the upper half of the reflector would always theoretically be reflected to the road at a point determined by the focusing of the light, but owing to the diffusion of the rays of light from each and every point of the deflector from which the reflected light emanates, some of the light that strikes the upper half of the reflector does not follow the focused rays, but distributes itself upwardly as well as downwardly. The upwardly extending rays enter the eye of the driver of a distant vehicle and on account of the difference of the light and darkness at night he is blinded by the rays that are thus diffused. To prevent such rays entering the eyes of an approaching driver, the visor 6 is used. The visor 6 extends forward some distance in advance of the lamp so as to completely intercept the diffused upwardly directed rays of light. It, however, is so shaped at its forward edge as to permit the focused rays to extend in proper theoretical paths or lines to light the roadway. The visor is formed of sheet metal and is shaped to conform with substantially one-half of a frustum of a cone, as determined by a plane passing through the axis of the frustum. The visor 6 is provided with a flange 7 whereby the visor 6 may be secured in position in front of the lamp by the clamping ring 2. The forward edge 8 of the visor substantially conforms to a semi-circle and the radius of the semi-circle described by the flange 7 of the visor 6 is considerably greater than the radius of the circle described by the forward edge 8 of the visor. Furthermore, the forward edge of the visor is located slightly above the center of the rays of light so as to avoid interception of the properly focusing rays of light and yet sufficiently low to prevent the rays of light coming directly from the lamp to rise high enough to enter the eye of the driver of an approaching vehicle. Furthermore, the visor is of sufficient length to intercept all upwardly extending diffused rays that extend from the upper half of the reflector of the lamp.

The rays of light that strike the lower half of the reflector pass upwardly through the focus of the light. This is also true of a large part of the diffused light that radiates from different points of the lower half of the reflector. In order to prevent the light emanating from the lower half of the reflector of the lamp from entering the eye of the operator of an approaching automobile or vehicle, I have provided a member which is so constructed that it will direct sections of the light beam or column coming from the lower half of the reflector, downward towards the road or sidewise to the right of the road, that is, to the right side of the lamp, thus preventing the escape, particularly, of the diffused rays rising from the lower half of the deflector.

The member 9 is formed of sheet metal and substantially covers the lower half of the lamp of the automobile. It is provided with a plurality of openings 10. The openings 10 are preferably hexagonal in form in order that the material between the openings may be reduced to the least possible amount. The openings may be made in the form of squares or triangles or circles in order to accomplish substantially the same results. In forming the openings, the metal is severed from the body of the member along all of their edges with the exception of one side part. Each portion that is thus struck up in forming an opening, is retained in its position along the said remaining edge where it is bent from the plane of the body portion of the member. The directions of the edges along which the struck-up portions are connected with the body portion of the member, vary according to the direction that it is desired to deflect the rays of light that pass through the openings that are thus formed. The edges that extend horizontally are located on the upper side of the openings where it is desired to deflect the light passing through the openings diagonally downward. The said edges are located vertically where it is desired to direct the rays of light laterally. Variations of the angles at which the rays of light are deflected are produced by placing the portions that are thus struck up at different angles relative to the body portion of the member 9. Thus, the portions 11 located on the right side of the lamp, which would be the left side of Figure 1 as shown in the drawings, are bent upwardly from the body portion of the member 9 about the edge of the openings 10 that extend horizontally. The portions 11 of the more extreme left side of the member 9, which is the right side of Figure 1, are bent outwardly along vertical edges of the openings 10 to deflect the light that passes through the said openings laterally, that is, along the center of the road and to the right side of the road. The portions 11 that shield the lower openings approach more nearly vertical to the body of the member 9 than those of the upper openings, as indicated in Fig. 2. This is because of the fact that the lower rays of light from the lower part of the reflector are less liable to reach the eye of the operator of an approaching automobile through the reticulated member than that which passes through the upper openings.

In order that the member 9 may be removed for cleaning the lens 3, the corners of the member 9 are cut away as at 12 to permit the member 9 to clear the flange or ledge 5 when the member is raised a short distance. In order that the member 9 may be easily handled, a lip 13 protrudes forwardly from the center of the upper edge of the member whereby the member 9 may be easily engaged and raised.

I have thus provided by my invention, an exceedingly simple and efficient device for confining the rays of light of an automobile lamp to paths or lines such that the roadway will be well lighted in advance of the automobile without permitting the emission of rays of light that will rise to such a height as to blind the driver of an approaching vehicle.

I claim:

In an automobile light deflector, a member having a plurality of closely positioned discs located in contiguous areas of the lens of the lamp and extending from the face of the lens of the lamp at different angles, the planes of the discs located at different angles to the planes extending through the centers of the discs and parallel with the axis of the lamp.

In testimony whereof, I have hereunto signed my name to this specification.

CLARK V. McCARLEY.